No. 719,699. PATENTED FEB. 3, 1903.
W. T. SEARS.
SAFETY EMERGENCY BRAKE.
APPLICATION FILED SEPT. 6, 1902.
NO MODEL. 2 SHEETS—SHEET 1.
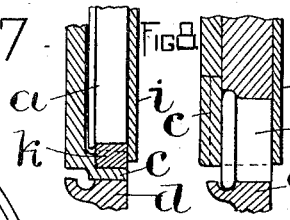
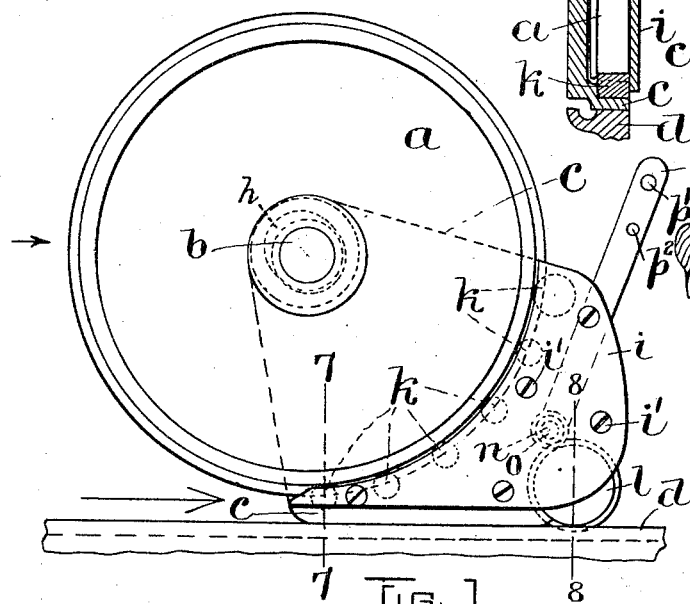
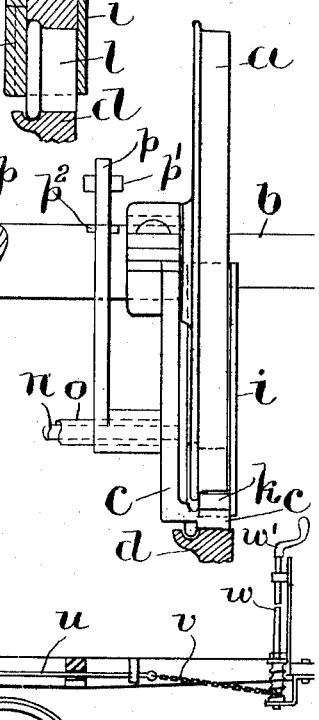
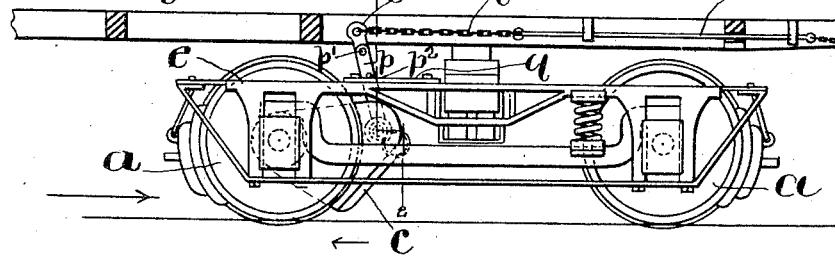
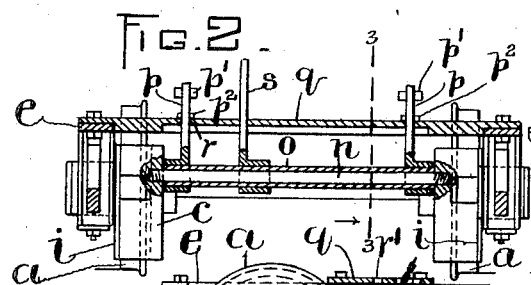
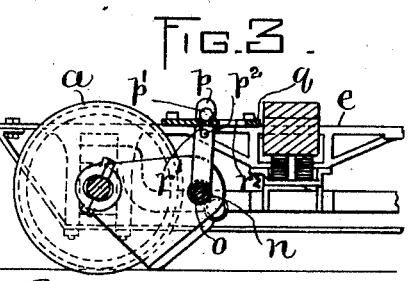
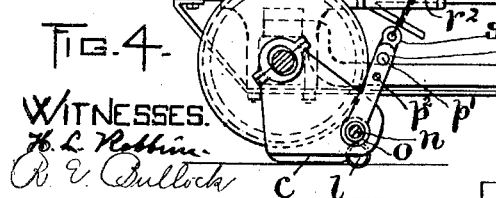
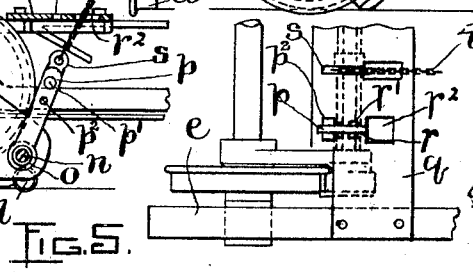
WITNESSES.
H. L. Robbins
R. E. Bullock
INVENTOR:
Willard T. Sears
by Wright, Brown & Quinby
Attys.

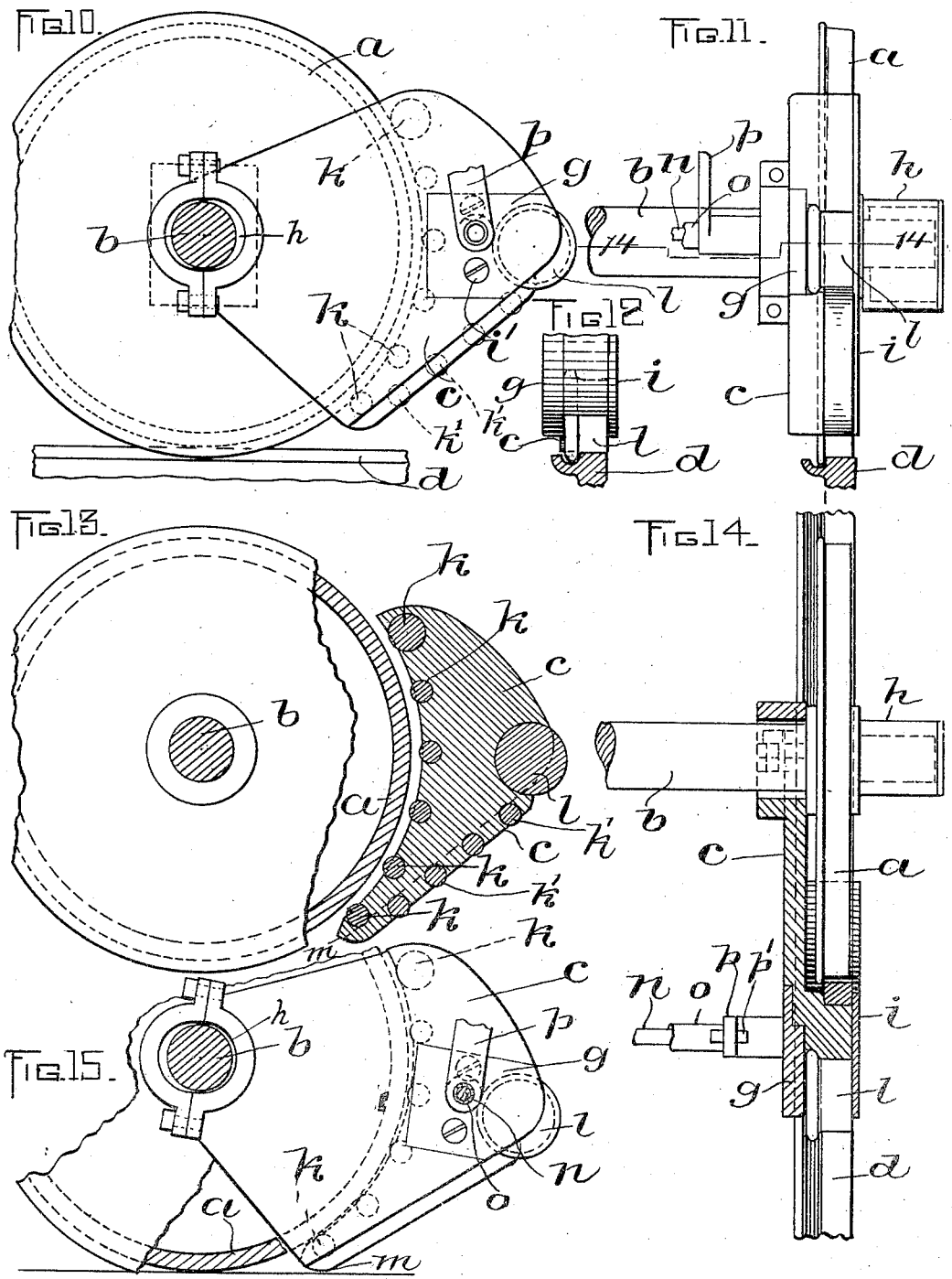

UNITED STATES PATENT OFFICE.

WILLARD T. SEARS, OF BOSTON, MASSACHUSETTS.

SAFETY EMERGENCY-BRAKE.

SPECIFICATION forming part of Letters Patent No. 719,699, dated February 3, 1903.

Application filed September 6, 1902. Serial No. 122,395. (No model.)

*To all whom it may concern:*

Be it known that I, WILLARD T. SEARS, of Boston, in the county of Suffolk and State of Massachusetts, have invented certain new and useful Improvements in Safety Emergency-Brakes, of which the following is a specification.

This invention relates to means for checking the momentum of wheels of various kinds, whether on vehicles or shafting or pulleys in general. It is designed, however, particularly with reference to use in connection with the wheels of motor or other vehicles, if for any reason the ordinary brakes fail to operate or cannot be operated quickly enough to fully check the car in emergencies, and the embodiment of my invention hereinafter described may be used without connection with any other braking device.

The object of the invention when embodied in a brake or stopping mechanism for vehicles is to produce a device of this character by means of which, if occasion requires, a braking action of a greater or less extent may be obtained directly against the surface upon which the vehicle runs, whether it be the ground, rails, or other surface, the construction being such that the momentum of the wheel or of the vehicle partly supported thereon may be practically employed to apply the necessary friction, without causing such an excessive movement of the checking device as would tend to carry it beyond the braking-point.

A further object of the invention is the production of a device of this character which may be partially applied to meet ordinary checking demands, but which upon a slight further movement will act to further check the movement of the wheel when desired.

To these ends the invention consists in the improvements which I will now proceed to describe and claim.

In the drawings, Figure 1 represents a side elevation of a truck of a car, one of the wheels of which is shown as having my invention applied thereto, said figure also showing a portion of the floor or frame of a car. Fig. 2 represents a section on line 2 2 of Fig. 1. Fig. 3 represents a section on line 3 3 of Fig. 2 looking in the direction of the arrow, but with the brake in the first stage of its action. Fig. 4 represents a view similar to Fig. 3, showing the brake in the second or final stage of its action for checking a car. Fig. 5 represents a plan view of the parts shown in Fig. 3. Fig. 6 represents an enlarged view of the parts shown in Fig. 4, but showing the brake which is applied to the wheel at the other end of the axle from that shown in Fig. 4. Fig. 7 represents a detail section on the line 7 7 of Fig. 6 looking in the direction of the arrow. Fig. 8 represents a section on line 8 8 of Fig. 6. Fig. 9 represents an elevation looking from the left of Fig. 6. Fig. 10 is a view similar to Fig. 6, but showing the brake in the position which it occupies when suspended out of action. Fig. 11 represents an elevation from the right of Fig. 10. Fig. 12 represents a detail elevation of the portion of the device which is shown in section in Fig. 8. Fig. 13 is a view similar to Fig. 10, with a portion of the wheel and with the main plate of the brake removed. Fig. 14 represents a horizontal section on the line 14 14 of Fig. 11. Fig. 15 represents a detail elevation of some of the parts similar to Fig. 10, with the brake-shoe in its first or preliminary stage of operation.

The same reference characters indicate the same parts in all the figures.

In the drawings I have illustrated my invention as applied to a car-wheel, the brake or friction shoe being designed to be interposed between said wheel and the rail upon which said wheel runs. It is to be understood, however, that in its broad aspect my invention is to be construed as equally capable of being applied to a pulley or other wheel carried by suitable shafting, it being necessary, however, in this instance to locate a bar in suitable juxtaposition to the wheel, which bar would take the place of the track-rail shown in the drawings, and which bar, moreover, would be supported so as to yield somewhat away from the shafting.

In the embodiment of the invention illustrated the wheel is represented at *a* and is shown as mounted upon an axle *b*, although it is to be understood that I do not limit myself to the mounting on the axle. The axle *b* is shown as supported in a truck-frame *e*, here represented somewhat conventionally, and supporting a car-body, a portion of which has the floor, as represented at *f*. The rail is indicated at *d*.

My improved brake consists of a shoe *c*, which is somewhat segmental in shape and is formed with a plate *g*, the latter having a somewhat elongated bearing *h*, through which the axle *b* passes. The longer diameter of the opening forming the bearing *h* is in the direction of the greatest length of the plate *g*. By comparing Figs. 6, 7, and 8 it will be seen that the lower edge of the hanger or shoe *c* is tangential to the wheel, while the plate *g* serves chiefly as a means of supporting the shoe and of holding it in its several proper positions relatively to the wheel. The shoe is formed with a curved edge corresponding with the tread of the wheel, and said shoe carries a series of rollers *k*, on which the wheel may ride when the parts are in the positions shown in Fig. 6. These rollers are shown mounted in suitable recesses in the shoe and are held therein by a plate *i*, secured to the shoe, as by screws *i'*. The portion of the shoe which is at the greatest distance from the axle *b* is provided with a wheel or roll *l*, adapted to lift the shoe over any obstructions it may encounter when turning and when the device is in the position shown in Fig. 6 and when the car is moving in the direction indicated by the arrow in that figure. The lower corner or angular portion of the shoe, which may be called the "tip," is slightly rounded or pointed, as at *m*, the purpose of which is to exert friction against the rail when the shoe is partially lowered, as to the position indicated in Figs. 3 and 15. When the device is in this position, a braking action will be effected, which will serve to gradually check the vehicle; but if the shoe be released, so that the forward motion of the vehicle will cause the wheel to ride up onto the shoe, due to the friction of the tip end with the rail or other surface, the shoe will be tilted to the position shown in Figs. 4 and 7, and thus cause such great friction as to quickly check the forward movement of the vehicle. Any tendency of the wheel to rotate, however, will be permitted by the rollers *k*, and therefore if the axle *b* has a motor mounted thereon the axle and motor would not be suddenly stopped by the checking action of the shoe. The checking or braking result is obtained between the straight edge of the shoe and the top of the rail or other surface, the shoe being kept in the position shown in Fig. 7 by the forward pressure of the axle *b*, the weight of the vehicle, and the plate-hangers of the shoe.

As shown in Figs. 10 and 13, the lower edge of the shoe or hanger is provided with a series of rollers *k'*, similar to the rollers *k* and also mounted in recesses. These rollers *k'* may be omitted, as indicated in the other figures; but when present they serve to prevent a too-sudden braking action against the surface *d*, owing to their rolling in their sockets. The friction between the wheel and said rollers and between the latter and the walls of their sockets causes a braking action that is ample for most purposes.

Various structures or mechanism may be employed for holding the shoe in the position shown in Figs. 1 and 10 and for lowering it from that position to the position shown in Figs. 3 and 15 and for then releasing the shoe, so that it will move to the position shown in Figs. 4 and 6. I will now describe the means which I have illustrated for accomplishing these results.

Referring to Fig. 2, it will be seen that the two shoes for the two wheels which are upon the same axle are connected by a rod *n*, so that both will be moved together. Mounted on this rod *n* is a sleeve *o*. This sleeve at each end is provided with an arm *p*, having two pins of different sizes, (represented at *p'* and *p²*.) The arms *p* extend through slots *r*, formed in a plate or bar *q*, supported by the truck-frame, each slot having small side notches *r'*, as shown in Fig. 5. The main slot, which is indicated at *r*, communicates with an opening *r²* in said plate *q*. As shown in Fig. 1, the small pin *p²* of the arm *p* rests upon the plate *q*. If the arm *p* be swung, however, to a position where the pin *p²* will slip through the slot *r*, the arm will be permitted to have a downward movement until the larger pin *p'* comes in contact with the top of the plate *q*. The construction of the arm *p* and its pins and the coacting slots is the same at each end of the sleeve *o*, and since the two arms are secured to said sleeve the arms must move together. Therefore when such movement of the arm *p* has occurred as just described, the sleeve *o* and the rod *n*, contained therein, and the two shoes descend to a limited degree. This degree is such as will permit the rounded or pointed tip *m* of the shoe to make contact with the rail or other surface, as indicated in Fig. 3. If now it be desired to release the shoes, so that the two wheels will ride up onto them, (or, in other words, so that the straight edges of the shoes will rest upon the rail,) the sleeve *o* is moved to a further extent, so that the pins *p'* of the arms *p* will slip through the large hole with which the slot *r* communicates, thus releasing the shoes, so that they can descend to the position indicated in Fig. 4. The means for operating the sleeve *o* comprise an arm *s*, secured to said sleeve and extending up through a slot in the plate *q* and having its upper end connected by a chain *t*, rod *u*, and chain *v* with a vertical shaft *w*, having a handle *w'*, said shaft and handle being of the type commonly employed in one form of brake-applying mechanism.

The object of elongating the bearing-openings *h* for the axle is to permit sufficient play in the direction of the greatest length of the hanger, so that when the hanger is raised from contact with the relatively stationary surface (as the rail *d*) the rollers *k* will not bear upon the periphery of the wheel; but at the same time these elongated openings or bearings will permit the device to move closely against the wheel when lowered against said relatively stationary surface.

The shoe is provided with means for engaging it with the rail $d$ or its equivalent in such manner as to prevent the shoe from slipping sidewise from its operative position over the rail. In the embodiment of my invention here shown this engagement is effected by a flange $l'$ on the roll $l$ and a groove $d'$ in the rail $d$, the flange entering the groove, as shown in Fig. 12.

I claim—

1. A wheel-brake comprising a movable shoe having an edge tangential to the wheel and adapted to contact with a fixed surface, and friction-rollers carried by said edge.

2. A wheel-brake comprising a movable shoe having one edge tangential to the wheel and another edge substantially concentric with said wheel, and friction-rollers carried by said edges.

3. A wheel-brake comprising a pivoted shoe adapted to oscillate on a center coincident with the axis of the wheel, said shoe having a friction-surface tangential to the wheel, and having also a toe portion adapted to bear against said friction-surface, and means for permitting the shoe to move so that its toe portion will contact with said friction-surface, or to move so that its tangential portion will make such contact.

4. A car-wheel brake comprising a shoe adapted to oscillate on a center coincident with the axis of the wheel, said shoe having an elongated friction-surface tangential to the wheel and adapted to contact with the surface of a rail, and means for holding said shoe entirely out of contact with the rail or to permit one end only of the tangential surface to contact with the rail.

5. A wheel-brake comprising a pivoted shoe adapted to oscillate on a center coincident with the axis of the wheel, said shoe having a friction-surface tangential to the wheel and provided with a series of rollers adjacent to the periphery of the wheel, said friction-surface being adapted to be moved toward or from a relatively stationary surface to check or release the wheel.

6. A wheel-brake comprising a pivoted shoe adapted to oscillate on the shaft of the wheel, the openings of the shoe being elongated in the direction of the greater length of the shoe, said shoe having a friction-surface tangential to the wheel and provided with a series of friction-rollers adjacent to the periphery of the wheel, said friction-surface being adapted to be moved toward or from a relatively stationary surface to check or release the wheel.

7. A wheel-brake comprising a pivoted shoe adapted to oscillate on a center coincident with the axis of the wheel, said shoe having a friction-surface tangential to the wheel and means for engaging said friction-surface with the rail to prevent edgewise displacement of the shoe from its operative relation with the rail, the shoe being provided with a series of friction-rollers adjacent to the periphery of the wheel.

8. A wheel-brake comprising a pivoted shoe adapted to oscillate on a center coincident with the axis of the wheel, said shoe having a friction-surface tangential to the wheel and having a roller at the end of said friction-surface, of a form to engage the tread-surface of the rail and provided with a series of friction-rollers adjacent to the periphery of the wheel, said friction-surface being adapted to be moved toward or from a relatively stationary surface to check or release the wheel.

9. A car-wheel brake comprising the plate $g$ hung upon the axle of the car and formed with elongated bearing-openings, a shoe or block carried by said plate and having a straight edge tangential to the axis of the wheel and adapted to fit the tread of a rail, said block or shoe having a curved edge conforming to the tread of the wheel and provided with rolls.

10. A car-wheel brake comprising a shoe adapted to oscillate on a center coincident with the axis of the wheel, said shoe having an enlongated friction-surface tangential to the wheel and adapted to contact with the tread of a rail, the forward end of said shoe being provided with a roller to elevate the friction-surface of the shoe over an obstruction.

In testimony whereof I have affixed my signature in presence of two witnesses.

WILLARD T. SEARS.

Witnesses:
A. W. HARRISON,
E. BATCHELDER.